Feb. 10, 1942.   E. M. MILLER   2,272,471
COFFEE MAKER
Filed April 11, 1940   2 Sheets-Sheet 1

INVENTOR.
EARL M. MILLER
BY
ATTORNEYS.

Feb. 10, 1942.　　　E. M. MILLER　　　2,272,471
COFFEE MAKER
Filed April 11, 1940　　　2 Sheets-Sheet 2

INVENTOR.
EARL M. MILLER
BY
ATTORNEYS.

Patented Feb. 10, 1942

2,272,471

UNITED STATES PATENT OFFICE 2,272,471

COFFEE MAKER

Earl M. Miller, Euclid, Ohio, assignor to Max Freedman, Cleveland, Ohio

Application April 11, 1940, Serial No. 329,137

14 Claims. (Cl. 219—44)

This invention is directed to improvements in coffee makers and the general object thereof is the provision of a combined electric resistance heating unit and a cold water receptacle which will be durable, efficient in operation, and which may be manufactured economically.

More specifically, other objects of my invention are the provision of an electric heating unit constructed in such a manner as to be vapor-proof, which will be adaptable to attachment to a glass cold water receptacle and which will permit of a constant flow of cold water to a water heating zone in the unit without interruption due to the formation of gas bubbles.

Other objects of my invention will become apparent from the following description which refers to the accompanying drawings illustrating a preferred embodiment of the invention. The essential characteristics of the invention are summarized in the claims.

Figure 1:
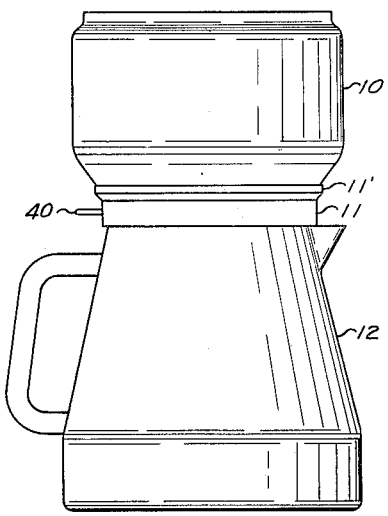
Figure 5:
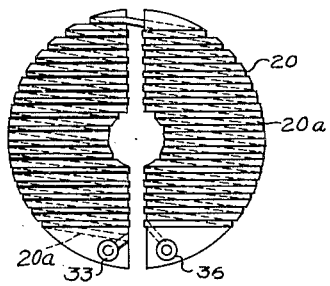
Figure 4:
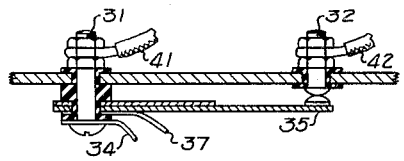
Figure 3:
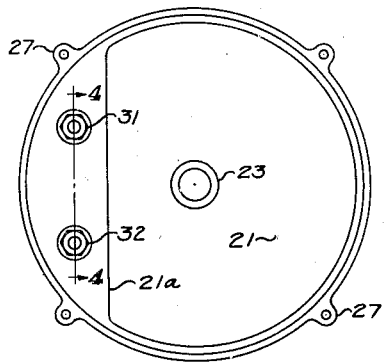
Figure 2:
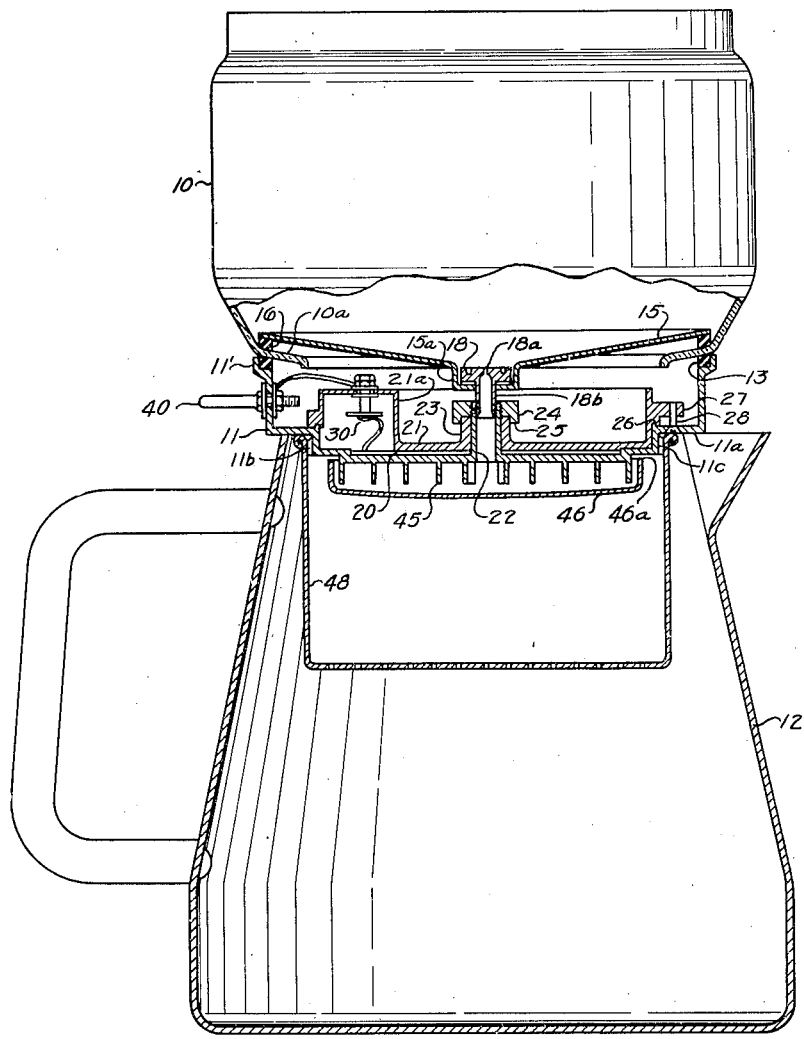

In the drawings, Fig. 1 is a side elevation of a coffee maker having incorporated therein the features of my invention; Fig. 2 is an enlarged partially cross sectional view taken centrally through the coffee maker and partially side elevation showing the essential parts thereof; Fig. 3 is a plan view of a heating unit which is part of my invention; Fig. 4 is a cross sectional view taken substantially along the line 4—4 of Fig. 3; and Fig. 5 is a plan view of a heating element which is part of my invention.

The operation and general arrangement of the coffee maker disclosed in the drawings consist of a cold water receptacle, a heating element thereunder and a brewed coffee container upon which the heating unit is adapted to set. The present application is concerned with improvements in construction and arrangements of parts to overcome difficulties heretofore encountered in attempts to obtain efficient operation and permanency of assembly of the various parts of such a coffee maker.

Referring to the drawings, 10 indicates a cold water receptacle preferably formed of glass, but without a glass bottom. The reference numeral 11 generally indicates the heating unit upon which the glass receptacle 10 rests and to which the latter is clamped and 12 identifies the coffee pot or brewed coffee container.

The heating unit preferably comprises a die cast metal frame which is provided with an upper annular seat 11' for retaining and supporting resilient gaskets 13 upon which the inwardly turned flange 10a of the cold water receptacle 10 may rest. As shown in the drawings, the water receptacle is provided with a metallic bottom in the form of a slightly coniformed metallic disc 15. The perimeter of disc 15 engages resilient gaskets 16 resting upon the inner face of the flange 10a of the receptacle 10 in clamping alignment with gaskets 13 carried by the frame. The false bottom member 15 is held in position by a centrally disposed tubular nut 18 resting in a depression 15a formed in the bottom 15 as will be hereinafter described.

The cold water flows substantially uniformly out of the receptacle 10 downwardly through the tubular nut 18 to a position beneath the frame of the heating unit. This frame is shaped in such manner as to support a flat disc shaped electric resistance heating element 20 in such manner that the element and its protecting thermostat 30 may be completely enclosed within the frame structure and sealed against the ingress of moisture by a housing or closure member 21. The heating element 20 may comprise turns 20a of flat resistance wire or ribbon wound about a thin mica case and upper and lower layers of mica. The frame and the housing member 21 as shown by the drawings are properly formed to permit such a sealed assembly without interfering with the desired functioning of these parts.

As shown, the frame is provided with an upwardly extending centrally located tubular formation 22 having in telescopic relation thereto, a centrally located upwardly extending tubular portion 23 formed on the housing member 21. The tubular portion 22 of the frame is threaded externally to receive a clamping nut 24, which, when tightened, clamps the central part of the housing member 21 to the heating element 20. The nut 24 is provided with a downwardly extending annular flange 25 which closely embraces the tubular portion 23 of the housing member 21 whereby a sealing compound may be used between the flanged part of the nut and the upper end of the tubular portion 23.

The housing member and the frame are provided with complementary annular seats indicated by the reference numeral 26, which may likewise be treated with a sealing compound for sealing the perimeter of the housing member 21 relative to the frame member 11. Outwardly extending spaced lugs 27 are provided upon the housing member 21 and are engaged by screw members 28 extending upwardly through a horizontal rest flange formation 11a formed on the frame whereby the perimeter of the housing may be firmly clamped to the interior of the frame.

thus effecting a completely sealed enclosure of the heating element 20.

As shown to the left in Fig. 2, a housing formation 21a is formed on the housing member 21 to enclose a thermostatic mechanism generally indicated by the reference numeral 30. Extending through the top of the thermostatic housing portion 21a are conductors 31 and 32 which are provided with suitable insulating mountings in sealed relation to the housing. The conductor 31 is connected to a terminal 33 of the heating element by a lead wire 34 while the conductor 32 has the inner end thereof formed to comprise a contact point which is in normal conductive engagement with a thermostatic bar 35. The thermostatic bar 35 is connected to the other terminal 36 of the heating element by a lead wire 37. The conductors 31 and 32 are connected respectively to plug connector bars 40 by lead wires 41 and 42, the bars 40 being suitably mounted in an insulated manner upon the frame 11 to extend outwardly therefrom.

Some of the difficulties heretofore encountered with so-called instantaneous down flow heating units proposed for coffee makers of the drip type, have been the warping of various parts when made sufficiently thin in cross section to obtain efficient heat transfer; the formation of condensation within the heating unit; the ingress of spilt water to the interior of the unit; and the fracture of glass receptacles the bottoms of which are subjected to a raise in temperature after the cold water has flowed therefrom and before the thermostat has functioned.

As shown in the drawings and as heretofore explained, the sealed condition of the joints between the elements housing and frame, prevents the ingress of moisture or water to the thermostat or to the heating element. Also the presence of air bubbles in the down flow passageway has been a source of considerable trouble in that the flow was frequently interrupted. To prevent warping of the frame and particularly the bottom thereof while obtaining a high degree of surface exposure to the downwardly flowing water to be heated, I provide a series of ribs 45 which are exteriorly disposed and extend downwardly from the bottom surface of the frame. These ribs are enclosed by a water heating pan 46, the perimeter of the pan being spaced from the bottom of the frame, but extending slightly above the under surface of the bottom wall of the frame. The tubular nut 18 is provided with an orifice 18a of predetermined size to substantially regulate the rate of flow of cold water downwardly through the tubular portion 18b and through the tubular portion 22 of the frame.

The bottom of the water heating pan 46 is rounded slightly downward so that, as the heated water flows over the perimeter 46a of the pan, the water flow will follow the under surface of the pan and drip therefrom at various distributed points.

A basket 48 for coffee grounds may be attached to the frame or if desired may rest upon the upper rim of the container 12. As shown, however, the basket is arranged in slip fit engagement with lugs 11b formed upon an under vertical side 11c of the frame. The pan 46 may be similarly slip fitted to engage the ends of the ribs 45.

It will be noted that the rib formation 45 greatly increases the heat transferring area of the underside or bottom wall of the frame and also increases the beam strength thereof. It will be further noted that the heating element is disposed immediately over the rib structure and in contact with the bottom wall of the frame member.

The thermostat housing is arranged to be an integral part of the heating element housing 21 so that the thermostat can be disposed in the immediate temperature environment of the terminals 33 and 36 of the heating element. This arrangement obtains a more accurate response of the thermostatic function and protects the heating element after the cold water has escaped downwardly out of the cold water receptacle 10 and the temperature of the residual water remaining in the pan 46 has been raised to the boiling point, and after the parts which are subjected to immediate heat influence have become dry.

By having a relatively large passageway for the downward flow of the water to the pan, accumulation of troublesome air bubbles immediately beneath the orifice 18a is prevented. It should be noted that the passageway is such as to increase in diameter from the small ingress of orifice downwardly and that there are no sharp shoulders. The end of the tube 18a is beveled and the shoulders beneath the orifice 18a are beveled and the restricted passageway is made quite short.

It is to be understood that the rib formation 45 may be varied. Corrugations, for example, might suffice to increase the heat transferring surface of the under side of the frame while increasing the strength thereof. Hence where the word ribs is used in the claims it will be apparent that formations other than the specific rib structure shown is intended to be included in the claims.

Other forms may be employed embodying the features of my invention instead of the one here explained, change being made in the form or construction herein disclosed, provided the elements stated by any of the following claims or the equivalent of such stated elements be employed.

I therefore particularly point out and distinctly claim as my invention:

1. An electric heating unit of the type adaptable for use with a cold water receptacle and a brewed coffee container comprising an annular frame having an upper seat formation for supporting a cold water receptacle, a cup shaped formation having heat conducting ribs formed on the underside thereof and a centrally disposed tubular portion extending upwardly to provide a cold water passageway to the under ribbed side of the frame; a disc-like electric resistance heating element disposed within the cup shaped part of the frame and adapted to lie on the upper face of the ribbed wall of the frame, a clamping member shaped to intimately engage the top of the heating element, means engaging the tubular portion of the frame for compressing the clamping member downwardly into engagement with the heating element, said clamping member being provided with an annular seat for engaging a complementary seat formed on the frame, means reacting between the frame and clamping member for clamping said frame and member together in a water tight manner, a cold water receptacle false bottom structure secured to the tubular formation on the frame provided with a restricted water flow passageway and serving as a means for clamping a cold water receptacle to the upper seat formation of the frame and a water heating pan enclosing the ribs of the frame.

2. An electric heating unit of the type adaptable for use between a cold water receptacle and a brewed coffee container comprising a frame having an upper seat for supporting a cold water receptacle, a cup shaped portion having heat conducting ribs formed on the underside thereof, and a centrally disposed tubular portion extending upwardly to provide a cold water passageway to the under ribbed side of the frame; a disc-like electric resistance heating element disposed on the inner face of the ribbed wall of the frame, a closure member shaped to engage the top of the heating element and having an annular seat to engage the frame, means engaging the tubular portion for compressing the central portion of the closure member downwardly into engagement with the heating element, means reacting between the frame and clamping member for clamping the annular seat of the closure member to the frame member in a water tight manner, a cold water receptacle bottom member connected to the tubular formation and having a restricted water flow passageway communicating with the passageway of the tubular portion of the frame and a hot water pan surrounding the ribs.

3. An electric heating unit of the type adaptable for use with a cold water receptacle and a brewed coffee container comprising a cast metal frame having a cup shaped part provided with heat conducting ribs formed on the underside thereof and a tubular portion extending upwardly to provide a cold water passageway to the ribs, an electric resistance heating element disposed within the cup shaped part of the frame in heat conductive contact therewith, a closure member adapted to enclose the heating element relative to the frame, means engaging the tubular portion for sealing the closure member relative to the frame, the closure member being provided with an annular seat for engaging the frame, means reacting between the frame and closure member for sealing said frame and closure member together in a water tight manner, a receptacle false bottom member secured to the tubular portion and means forming a seal between the false bottom member and top surface of the frame and having a restricted water flow passageway communicating with the interior of the tubular portion.

4. An electric heating unit of the type adaptable for use with a cold water receptacle and a brewed coffee container comprising a frame having a cup shaped part provided with heat conducting ribs formed on the underside thereof and having a cold water duct portion extending upwardly to provide a passageway to the ribs, a heating element disposed within the cup shaped part of the frame in heat conductive proximity to said ribs, a closure member adapted to enclose the heating element relative to the frame and forming with the frame a thermostat compartment, means engaging the duct portion for clamping the closure member downwardly, the closure member being adapted to engage an annular seat formed on the frame, means for clamping the frame and the closure member together in a water tight manner to thereby form a sealed compartment for a thermostat and the heating element, electric plugs mounted on the frame, conductor members extending from said plugs to said heating element, a thermostat within said compartment interposed between said plugs and said heating element.

5. In a coffee maker of the drip type, the combination of a cold water receptacle and an electric water heating unit in clamped engagement with the bottom of the receptacle, said unit comprising a flat bottom cup shaped frame provided with ribs on the bottom wall thereof, a resistance heating element in heat conductive contact with said ribs, a clamping member, said clamping member and frame being provided with upwardly extending telescoped tubular portions, means for clamping the perimeter of the clamping member to the frame, a second means clampingly securing said tubular portions together, tubular means in adjustable engagement with the tubular portion of the frame, a false bottom member for the cold water receptacle clampingly engaged by said tubular means and a water heating pan attached to and enclosing the ribs, the perimeter of the pan being spaced from the ribs.

6. In a coffee maker of the drip type the combination of a cold water receptacle, an electric water heating unit in clamped engagement with the bottom of the receptacle, said unit comprising a flat bottom frame member provided with downwardly extending exposed ribs, a resistance heating element in heat conductive contact with said ribs, a closure member, said members forming a thermostat and heating element compartment, said members being provided with upward extending telescoped tubular portions in clamped and sealed relation, tubular means in adjustable engagement with the tubular portion of the frame, a bottom member for the cold water receptacle clampingly engaged by said tubular means and a water heating pan disposed beneath the bottom and enclosing the ribs of the frame, whereby to permit the heated water to flow over the perimeter of the pan.

7. In a coffee maker of the drip type, the combination of a cold water receptacle, an electric water heating unit in clamped engagement therewith, said unit having a frame with exteriorly disposed water heating ribs, a resistance heating element in heat conductive contact with said ribs, a closure member, means for clamping the perimeter of the closure member to the frame, a second means clampingly securing the central portion of the closure member and the frame together, tubular means in adjustable engagement with the central portion of the frame, a metal bottom member for the cold water receptacle engaged by said tubular means, and a water heating pan spaced from and enclosing the ribs whereby to permit heated water to flow over said pan.

8. In a coffee maker of the drip type, the combination of a cold water receptacle, an electric water heating unit in clamping engagement with the bottom thereof, said unit comprising a flat bottomed frame provided with ribs depending from the bottom wall thereof, a resistance heating element in heat conductive contact with said bottom, a closure member providing a thermostat compartment, the frame having a tubular portion extending through the closure member, means clamping the closure member to the frame to form a sealed heating element and thermostat compartment, a thermostat disposed therein, means in adjustable engagement with the frame, a metal bottom member for the cold water receptacle engaged by said adjustable means, and a water heating pan enclosing the ribs, said adjustable means forming a water duct leading to a passageway extending through the closure member and the frame to said pan.

9. In a coffee maker of the drip type, the combination of a cold water receptacle, an electric water heating unit upon which the receptacle is supported, said unit comprising a frame structure provided with ribs on a bottom wall thereof, a pan surrounding said ribs, a water heating pan associated with the ribs, a resistance heating element in heat conductive contact with said ribs, a thermostat disposed within the frame, a member overlying the heating element and housing the thermostat, means for clamping the perimeter and the central portion of the housing to the frame, the housing and frame being provided with a centrally disposed water passageway extending therethrough and downwardly to said pan and having a flow orifice of predetermined size, tubular means in adjustable relation to said passageway, and a metal bottom member for the cold water receptacle clampingly engaged by said tubular means.

10. In a coffee maker of the drip type the combination of a cold water receptacle, an electric water heating unit upon which the receptacle is supported, said unit comprising a frame structure with exterior ribs on a bottom wall thereof, a pan into which said ribs project, a resistance heating element in heat conductive contact with said ribs, a thermostat and heating element housing, means for clamping the perimeter and the central portion of the housing into a vapor seal relation to the frame, the housing and frame being provided with a centrally disposed water passageway extending therethrough downwardly to said pan, and tubular means in adjustable relation to said passageway having an orifice of predetermined size.

11. In a coffee maker of the drip type, the combination of a cold water receptacle, an electric water heating unit to which the receptacle is clamped, said unit comprising a frame structure provided with heat conducting ridges on the bottom wall thereof, a resistance heating element in heat conductive contact with said ridged wall, a pan into which the ridges project, a protective thermostat for said heating element, a housing for enclosing the thermostat and heating element in sealed relation to the frame, means for clamping the perimeter and the central portion of the housing to the frame, the housing and frame being provided with centrally disposed tubular structures providing a water passageway extending therethrough and downwardly to said pan, tubular means in adjustable relation to said passageway, a metal bottom member for the cold water receptacle clampingly engaged by said tubular means and through which the tubular means extends, and means for sealing the tubular means relative to said false bottom member.

12. In a coffee maker, the combination of a receptacle, a heater supporting said receptacle, said heater having ribs projecting from the bottom surface thereof, a shallow pan into which said ribs project, said receptacle and said heater being provided with an opening leading to said pan, and a container disposed below said pan whereby overflow from said pan is caught in said container.

13. In a coffee maker, the combination of a receptacle, a heater supporting said receptacle, said heater having ribs projecting from the bottom surface thereof, a shallow pan into which said ribs project, said receptacle and said heater being provided with an opening leading to said pan, the bottom of said pan being rounded downwardly.

14. In a coffee maker, the combination of a glass receptacle having an open bottom, a heater independent of said receptacle presenting a seat for said bottom, a false bottom for said receptacle resting on the edge of said bottom, said false bottom being substantially coextensive in diameter with said receptacle and means for securing said false bottom to said heater, said means having a passageway therethrough.

EARL M. MILLER.